(12) United States Patent
Chen

(10) Patent No.: US 10,257,464 B2
(45) Date of Patent: Apr. 9, 2019

(54) METHOD AND SYSTEM FOR PROCESSING IMAGES IN A VIDEO

(71) Applicant: Yen-Tso Chen, Taipei (TW)

(72) Inventor: Yen-Tso Chen, Taipei (TW)

( * ) Notice: Subject to any disclaimer, the term of this patent is extended or adjusted under 35 U.S.C. 154(b) by 0 days.

(21) Appl. No.: 15/888,106

(22) Filed: Feb. 5, 2018

(65) Prior Publication Data

US 2018/0241968 A1 Aug. 23, 2018

(30) Foreign Application Priority Data

Feb. 17, 2017 (TW) .............................. 106105170 A

(51) Int. Cl.
*H04N 7/14* (2006.01)
*H04N 7/15* (2006.01)
(Continued)

(52) U.S. Cl.
CPC ........... *H04N 7/152* (2013.01); *H04L 65/403* (2013.01); *H04L 65/4092* (2013.01);
(Continued)

(58) Field of Classification Search
CPC ... G01S 5/0072; G06F 17/3028; H04L 12/18; H04L 63/102; H04L 63/105; H04L 65/403; H04L 65/4038; H04L 65/4084; H04L 65/4092; H04L 65/602; H04L 65/604; H04L 65/605; H04L 65/607; H04M 1/72572; H04M 2201/40; H04M 2250/52; H04M 3/4936; H04M 3/5191; H04N 2007/145; H04N 5/272; H04N 5/44591; H04N 7/14; H04N 7/141; H04N 7/142; H04N 7/144; H04N 7/147; H04N 7/148; H04N 7/15; H04N 7/152; H04N 7/155;
(Continued)

(56) References Cited

U.S. PATENT DOCUMENTS 6,195,116 B1 * 2/2001 Lee ........................ H04N 7/147
348/14.09
7,570,943 B2 * 8/2009 Sorvari ............. G06F 17/30884
379/88.17
(Continued)

FOREIGN PATENT DOCUMENTS

JP 2000-253374 A 9/2000
JP 2007-81863 A 3/2007
(Continued)

*Primary Examiner* — Khai N. Nguyen
(74) *Attorney, Agent, or Firm* — Winston Hsu

(57) ABSTRACT

The present invention provides a method for processing images in a video. The method includes after providing a plurality of first video images to a server, a plurality of video devices proposing a request message related to a second video image to the server; and the plurality of video devices receiving and displaying the second video image from the server; wherein the server performs a transcoding process on the received plurality of first video images for at least one time to obtain the second video image; wherein a hierarchical structure exists between the server and the plurality of video devices; wherein the second video image comprises the plurality of first video images and a screen layout of the plurality of first video images in the second video image is controlled by a control terminal.

8 Claims, 5 Drawing Sheets

(51) Int. Cl.
*H04L 29/06* (2006.01)
*H04N 21/2343* (2011.01)
*H04N 21/2743* (2011.01)
*H04N 21/472* (2011.01)
*H04N 21/485* (2011.01)
*H04N 5/445* (2011.01)

(52) U.S. Cl.
CPC ....... *H04L 65/605* (2013.01); *H04N 21/2343* (2013.01); *H04N 21/2743* (2013.01); *H04N 21/47202* (2013.01); *H04N 21/4858* (2013.01); *H04N 5/44591* (2013.01)

(58) Field of Classification Search
CPC ..... H04N 7/157; H04N 7/23206; H04W 4/18; H04W 4/185
USPC ......... 348/14.01, 14.02, 14.03, 14.04, 14.05, 348/14.06, 14.07, 14.08, 14.09, 14.1, 348/14.11, 14.12, 14.13, 14.14, 15.15, 348/14.16; 382/275; 379/265.03; 455/414.1, 566; 704/270
See application file for complete search history.

(56) References Cited

U.S. PATENT DOCUMENTS

| | | | | |
|---|---|---|---|---|
| 7,860,994 B2* | 12/2010 | Rensin | ............. | H04L 29/06027 455/456.3 |
| 7,877,502 B2* | 1/2011 | Rensin | ............. | H04L 29/06027 455/456.3 |
| 7,949,730 B2* | 5/2011 | Rensin | ............. | H04L 29/06027 341/176 |
| 8,041,829 B2* | 10/2011 | Rensin | ............. | H04L 29/06027 455/456.3 |
| 8,244,589 B2* | 8/2012 | Vincent | ................ | G06Q 30/02 455/414.1 |
| 9,356,980 B2* | 5/2016 | Baldwin | ............... | H04L 65/605 |
| 9,374,451 B2* | 6/2016 | Salmenkaita | ..... | H04M 1/72561 |
| 9,467,649 B2* | 10/2016 | Xie | ........ | H04N 7/152 |
| 9,491,093 B2* | 11/2016 | Baldwin | ................ | H04L 45/24 |
| 9,497,311 B2* | 11/2016 | Salmenkaita | ..... | H04M 1/72561 |
| 9,973,556 B2* | 5/2018 | Baldwin | ............... | H04L 65/605 |
| 9,998,710 B2* | 6/2018 | Choi | ..................... | H04N 7/147 |
| 2004/0043758 A1* | 3/2004 | Sorvari | ............ | G06F 17/30884 455/414.1 |
| 2004/0176958 A1* | 9/2004 | Salmenkaita | ..... | H04M 1/72561 704/275 |
| 2006/0088096 A1* | 4/2006 | Han | ...................... | H04N 19/00 375/240.03 |
| 2008/0079801 A1* | 4/2008 | Eri | .......................... | H04N 7/15 348/14.09 |
| 2011/0043600 A1* | 2/2011 | Gopal | .................. | H04L 12/1881 348/14.09 |
| 2014/0040364 A1* | 2/2014 | Baldwin | ............... | H04L 65/605 709/204 |
| 2014/0040493 A1* | 2/2014 | Baldwin | ................ | H04L 45/24 709/231 |
| 2016/0014370 A1* | 1/2016 | Xie | ....................... | H04N 7/152 348/14.02 |
| 2016/0248826 A1* | 8/2016 | Baldwin | ............... | H04L 65/605 |
| 2016/0277561 A1* | 9/2016 | Salmenkaita | ..... | H04M 1/72561 |
| 2017/0013035 A1* | 1/2017 | Baldwin | ................ | H04L 45/24 |
| 2017/0201609 A1* | 7/2017 | Salmenkaita | ..... | H04M 1/72561 |
| 2017/0201719 A1* | 7/2017 | Choi | ..................... | H04N 7/147 |

FOREIGN PATENT DOCUMENTS

| | | |
|---|---|---|
| TW | 525383 | 3/2003 |
| TW | 201543901 A | 11/2015 |
| TW | 201545561 A | 12/2015 |

\* cited by examiner

METHOD AND SYSTEM FOR PROCESSING IMAGES IN A VIDEO

BACKGROUND OF THE INVENTION

1. Field of the Invention

The present invention relates to a method and system for processing images in a video, and more particularly, to a method and system for processing images in a video capable of saving transmission bandwidth.

2. Description of the Prior Art

With the advancement of technology, many behavior modes in life have been significantly changed. For example, people at different places may carry out a video meeting, which is like in a same space, via cooperation of relative devices, so as to shorten distances between people, and transmit things beyond words more precisely via the internet.

In general, users of two or more terminals should use the same platform with the current video service on the internet to carry out the video meeting, and then experience the video service on the internet after logging into the platform. However, when the users of multiple terminals are experiencing the video services on the internet mentioned above, usually, video images of oneself and another user's maybe displayed on a single video device, but the video images of all users may not be simultaneously displayed via the video meeting on the internet. For example, when a multinational enterprise is having an international video meeting, current video services on the internet may only provide the video images of a chairman and oneself, the video images of all participants are unavailable. In addition, when the users want to see the video images of multiple users at the same time, extra bandwidth is occupied for transmitting the video images. Therefore, an improvement for the prior art is necessary.

SUMMARY OF THE INVENTION

Therefore, the objective of the present invention is to provide a video image service for multi-terminal internet controlled by a control terminal, which saves bandwidth when transmitting multiple video images, and improves conveniences when utilizing video service on the internet.

The present invention discloses a method for processing images in a video, comprising after providing a plurality of first video images to a server, a plurality of video devices proposing a request message related to a second video image to the server; and the plurality of video devices receiving and displaying the second video image from the server; wherein the server performs a transcoding process on the received plurality of first video images for at least one time to obtain the second video image; wherein a hierarchical structure exists between the server and the plurality of video devices; wherein the second video image comprises the plurality of first video images and a screen layout of the plurality of first video images in the second video image is controlled by a control terminal.

The present invention further discloses a system for processing images in a video, comprising a server; and a plurality of video devices, for providing a plurality of first video images to the server, and receiving and displaying a second video image from the server after proposing a request message related to the second video image to the server; wherein the server performs a transcoding process on the received plurality of the first video images for at least one time to obtain the second video image; wherein a hierarchical structure exists between the server and the plurality of the plurality of video devices; wherein the second video image comprises the plurality of first video images and a screen layout of the plurality of first video images in the second video image is controlled by a control terminal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
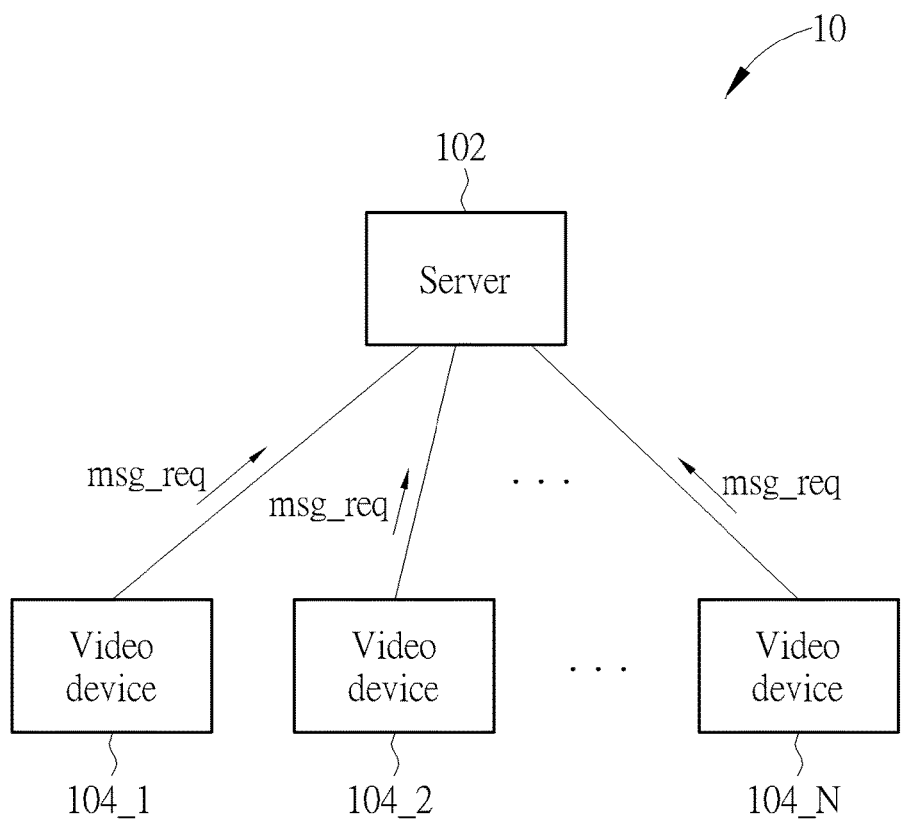
FIG. 1 is a schematic diagram of a schematic diagram of a video image processing system according to an embodiment of the present invention.

Please refer to FIG. 1, which is a schematic diagram of a schematic diagram of a video image processing system 10 according to an embodiment of the present invention. The video image processing system 10 includes a server 102 and a plurality of video devices 104_1-104_N for handling images and audio messages captured by the video devices. In brief, a hierarchical structure exists between the server 102 and the video devices 104_1-104_N. Each of the video devices 104_1-104_N provides a first video image to the server 102, and after proposing a request message msg_req related to a second video image to the server 102, each of the video devices 104_1-104_N receives and displays the second video image from the server 102. In order to present the video images provided by all other video devices on each video device when having an internet video, much bandwidth will be occupied if the server 102 transmits the first video images from all of the video devices 104_1-104_N to the video devices 104_1-104_N at the same time. Therefore, the server 102 of an embodiment of the present invention transcodes all of the received first video images to the second video image, and transmits the second video image to the video devices 104_1-104_N, so as to save the bandwidth.

In detail, the first video image transmitted by the video devices 104_1-104_N respectively occupies a first bandwidth. When the video devices 104_1-104_N simultaneously transmit the first video images to the server 102, and propose the request messages msg_req related to the second video image to the server 102, the server 102 transcodes the first video images from the video devices 104_1-104_N into the second video image, and transmits the second video image to the video devices 104_1-104_N. Under this circumstance, a second bandwidth of the second video image is smaller than a sum of all of the first bandwidths, and thus, the occupied bandwidth is significantly reduced when transmission. In other words, when any video device proposes the request message msg_req related to the video images of the video devices 104_1-104_N to the server 102, the server 102 only needs to transmit the second video image after transcoding to all of the video devices 104_1-104_N, rather than transmitting the first video image from each of the video devices 104_1-104_N to each of the video devices 104_1-104_N, so as to effectively reduce the transmission bandwidth, system loading of the server 102 and achieve effect of risk diversification.

Figure 2A:
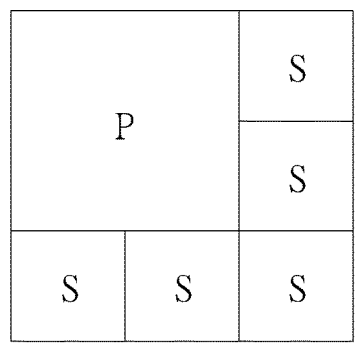
FIGS. 2A to 2D are schematic diagrams of a schematic diagram of a screen layout of a second video image according to an embodiment of the present invention.
Figure 2B:
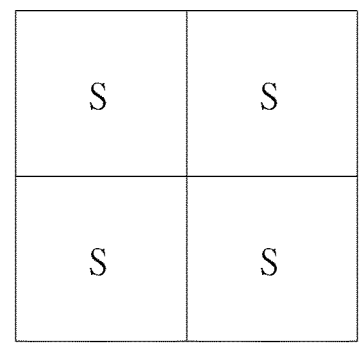
Figure 2C:
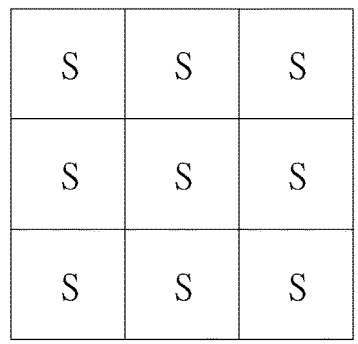
Figure 2D:
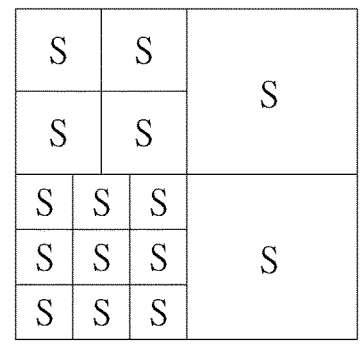

Under the situation stated above, the second video image includes multiple first video images. As to a screen layout of the second video image, please continue to refer to FIGS. 2A to 2D. In this embodiment, the server 102 may determine any video device as a control terminal to control the screen layout of the second video image. For example, as shown in FIG. 2A, when the video device 104_2 is the control terminal, the video device 104_2 may control a primary video screen P of the second video image to display its image, and allocate or randomly display each of the video images of other video devices on a secondary video screen S. Or, as shown in FIG. 2B, the video device 104_2 may also control the video images of all video devices 104_1-104_N to display equally, for example, when the video images of four video devices are needed to be displayed at the same time, the screen layout of a 2-by-2 grid is arranged on the secondary screen S for displaying. Or, as shown in FIG. 2C, when the video images of nine video devices are needed to be displayed at the same time, the screen layout of a 3-by-3 grid is arranged on the secondary screen S for displaying. Moreover, the control terminal may transcode the video images from the video devices 104_1-104_N (i.e. from FIG. 2A to FIG. 2C) for the first time, and then transcode for the second time with the video images uploaded from other video devices, so as to obtain the second video image shown in FIG. 2D. Therefore, the second video image may simultaneously include the video images without transcoding and the transcoded video images, and the second video image may be presented with the screen layout of multiple secondary screens S. Certainly, according to system or user requirements, the control terminal may transcode the video images from the video devices 104_1-104_N for once, twice or three times, and then transmit the transcoded second video image to the video devices proposing for the second video image. That is, the times of transcoding process of the received images from the video devices 104_1-104_N performed by the control terminal is not limited to once or twice, the times of transcoding process and the screen layout of the second video image for displaying may be controlled by the requirements.

Notably, when the server 102 determines any video device as the control terminal, the determined video device may not only control the screen layout of the second video image, but also assign other video devices as the control terminal. In other words, the control terminal may choose to transfer its control right to other video devices. In this way, the server 102 and the video device with the control right of the video image processing system 10 of the embodiment of the present invention determine the screen layout of the second video image, so as to improve degree of freedom of allocating images of the video service on the internet.

For example, when a multinational enterprise is going to hold an international video meeting, after each branch is connected to an internet video server, a head office is taken as the control terminal (or by system default) to host the meeting. Then, after the internet video server transcodes the video images from each branch, the screen layout of the video images from each branch is determined by the head office (control terminal). That is, the head office (control terminal) may arrange the video image of a chairman on the primary video screen, and arrange the video images of each branch on the secondary video screen. In this way, staffs participated in the meeting from each branch may perform interactions and communications via the video image processing system.

Figure 3:
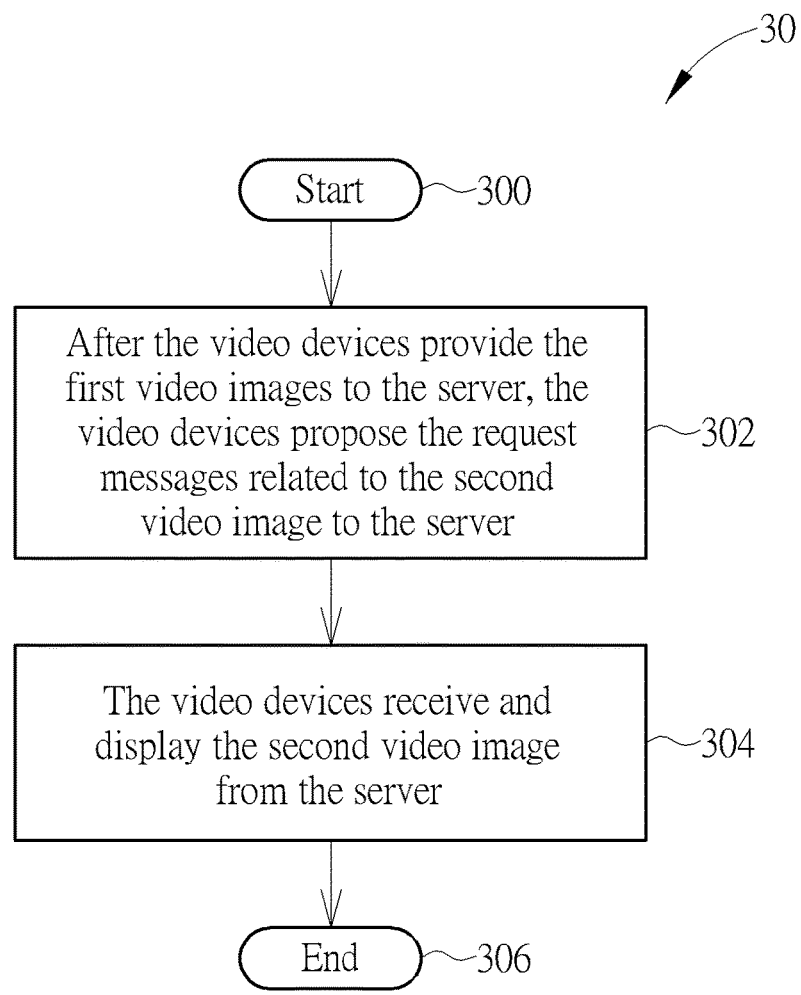
FIG. 3 is a schematic diagram of a schematic diagram of a flowchart according to an embodiment of the present invention.

An operation method of the video image processing system 10 can be concluded into a flowchart 30, as shown in FIG. 3. Flowchart 30 may be utilized to process the video images, which includes the following steps:

Step 300: Start.

Step 302: After the video devices 104_1-104_N provide the first video images to the server 102, the video devices 104_1-104_N propose the request messages related to the second video image to the server 102.

Step 304: The video devices 104_1-104_N receive and display the second video image from the server 102.

Step 306: End.

Please refer to the statement above for detailed description of the flowchart 30, and is not narrated herein for brevity.

Figure 4:
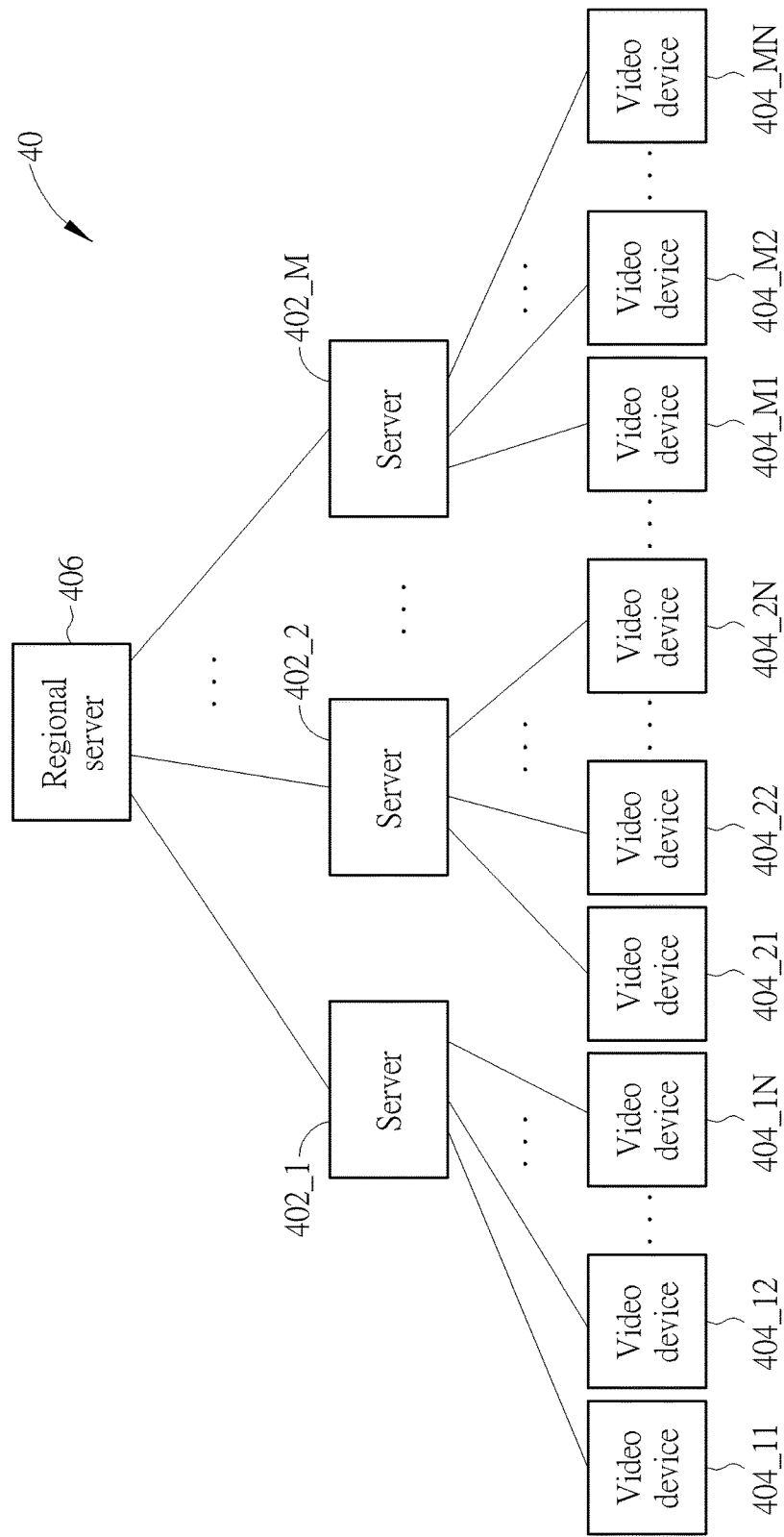
FIG. 4 is a schematic diagram of a schematic diagram of another video image processing system according to an embodiment of the present invention.
Figure 5:
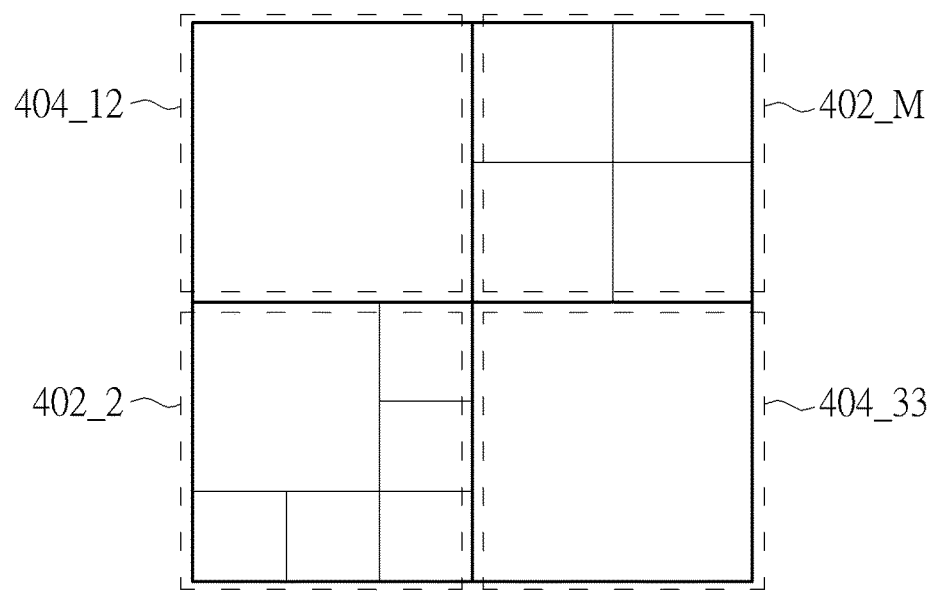
FIG. 5 is a schematic diagram of a schematic diagram of another screen layout of the second video image according to an embodiment of the present invention.

Moreover, in order to provide the video service on the internet more thoroughly, the present invention further provides a video image processing system 40 such that more users may participate in the video meeting on the internet to perform communications and interactions at the same time, as shown in FIG. 4. Different with the video image processing system 10 in FIG. 1, the video image processing system 40 further includes a regional server 406 for receiving the video images from a plurality of servers 402_1-402_M under the original hierarchical structure of the video image processing system 10, so as to transcode the video images from all of the servers. That is, the video images of the video devices 404_11-404_MN are transcoded by the servers 402_1-402_M, and then transcoded by the regional server 406 to the video image which occupies a single bandwidth, and transmits to each video device. As such, when a large amount of users are using the internet video, the video images of all or part of the users may be seen and not much transmission bandwidth is occupied, which reduces loading of the regional server 406 and the servers 402_1-402_M and achieves the objective of risk diversification. Similarly, the regional server 406 may also assign any of the video devices 404_11-404_MN or the servers 402_1-402_M as the control terminal to perform the screen layout after transcoding. For example, please refer to FIG. 5, which is a schematic diagram of a schematic diagram of the screen layout of the second video image according to an embodiment of the present invention. When the server 402_1 is the control terminal (the control terminal may also be any one of the servers or any one of the video devices with processing device, but not limited thereto), the control terminal may control the video images from all of the video devices 404_11-404_MN and the servers 402_1-402_M to perform at least one time transcoding process (i.e. not limited to perform single time of transcoding process, multiple times of transcoding processes are also suitable). Therefore, in an embodiment, as shown in FIG. 5, the second video image transcoded by the regional server 406 includes the video images of end terminals of the video devices 404_12, 404_33 (not depicted in FIG. 4) and the video images transcoded by the servers 402_2, 402_M. Then, the regional server 406 transmits the transcoded second video image to each server and video device. Therefore, the video image processing system 40 of the present invention utilizes the servers 402_1-402_M and the regional server 406 for controlling the displaying method by the control terminal under the circumstance of not occupying too much bandwidth to reduce the system loading and achieve the risk diversification, such that more users may participate in the video service on the internet more conveniently.

In an alternative embodiment, when an amount of user is large, the video images of users at different places may be uploaded to its group of server, and then the servers at different places transmit the transcoded video images to upper serves (i.e. regional server), so as to transcode the video images form all video devices to the video image, which occupies the single bandwidth. For example, if banks located at each county of Taiwan are going to hold the video meeting on the internet, all bank branches maybe divided into groups of Taiwan regional server (i.e. regional server), Taipei server, Taichung server, Kaohsiung server and so on. In this way, the users may utilize the video image processing system of the present invention for experiencing the video meeting on the internet with a large amount of users at the same time, and the transcoding of the video images saves the bandwidth and improves the practicality and conveniences of the video image processing system.

Notably, the embodiments stated in the above are utilized for illustrating the concept of the present invention. Those skilled in the art may make modifications and alterations accordingly, and not limited herein. For example, the allocation method of the screen layout may not only be determined by the control terminal, but also be determined by the servers, and the times of transcoding process is not limited to one or two times; according to the hierarchical structure, except for setting the regional server, upper processing devices may be implemented to expand service range and the amount of users of the video image processing system of the present invention. Or, the present invention can be utilized in enterprise video meetings and remote curriculums, and not limited herein, which belong to the scope of the present invention.

In summary, the present invention provides a method and system for video image processing, which is capable of transcoding the video images to save the bandwidth when transmitting the multiple video images, reduce the system loading to decentralize risks, and improve the conveniences of the video services on the internet.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for processing images in a video, comprising:
    after respectively providing a plurality of first video images to a plurality of servers, a plurality of video devices respectively proposing a request message related to a second video image to the plurality of servers;
    the plurality of video devices receiving and displaying the second video image from the plurality of servers; and
    a regional server performing a transcoding process on the second video image from the plurality of servers for at least one time to generate a third video image and transmitting to the plurality of servers and the plurality of video devices;
    wherein the plurality of servers perform the transcoding process on the received plurality of first video images for at least one time to obtain the second video image and transmit to the regional server and the plurality of video devices;
    wherein a hierarchical structure exists among the regional server, the plurality of servers and the plurality of video devices;
    wherein transmitting the plurality of first video images needs a plurality of first bandwidths, and transmitting the second video image needs a second bandwidth, wherein the second bandwidth is smaller than a sum of the plurality of first bandwidths;
    wherein the second video image and the third video image comprise the plurality of first video images and a screen layout of the plurality of first video images in the second video image is controlled by the regional server or any one of the plurality of servers.

2. The method of claim 1, wherein a control terminal is chosen from the regional server, any one of the plurality of servers or any video device of the plurality of video devices to determine the screen layout.

3. The method of claim 1, wherein the screen layout comprises a primary video screen and a plurality of secondary video screens.

4. The method of claim 1, wherein the screen layout comprises a plurality of secondary video screens.

5. A system for processing images in a video, comprising:
    a regional server;
    a plurality of servers; and
    a plurality of video devices, for respectively providing a plurality of first video images to the plurality of servers, and receiving and displaying a second video image from the plurality of servers after respectively proposing a request message related to the second video image to the plurality of servers;
    wherein the plurality of servers perform a transcoding process on the received plurality of the first video images for at least one time to obtain the second video image and transmit to the regional server and the plurality of video devices;
    wherein the regional server performs the transcoding process on the second video image from the plurality of servers for at least one time to generate a third video image and transmits to the plurality of servers and the plurality of video devices;
    wherein a hierarchical structure exists among the regional server, the plurality of servers and the plurality of the plurality of video devices;
    wherein transmitting the plurality of first video images needs a plurality of first bandwidths, and transmitting the second video image needs a second bandwidth, wherein the second bandwidth is smaller than a sum of the plurality of first bandwidths;
    wherein the second video image and the third video image comprise the plurality of first video images and a screen layout of the plurality of first video images in the second video image is controlled by the regional server or any one of the plurality of servers.

6. The system of claim 5, wherein a control terminal is chosen from the regional server, any one of the plurality of servers or any video device of the plurality of video devices to determine the screen layout.

7. The system of claim 5, wherein the screen layout comprises a primary video screen and a plurality of secondary video screens.

8. The system of claim 5, wherein the screen layout comprises a plurality of secondary video screens.

\* \* \* \* \*